(12) United States Patent
Miyazaki (10) Patent No.: US 8,915,641 B2
(45) Date of Patent: Dec. 23, 2014

(54) DISPLAY DEVICE

(71) Applicant: Japan Display East Inc., Mobara (JP)

(72) Inventor: Hiroyuki Miyazaki, Mutsuzawa-machi (JP)

(73) Assignee: Japan Display Inc., Tokyo (JP)

(*) Notice: Subject to any disclaimer, the term of this patent is extended or adjusted under 35 U.S.C. 154(b) by 72 days.

(21) Appl. No.: 13/711,695

(22) Filed: Dec. 12, 2012

(65) Prior Publication Data

US 2013/0155721 A1 Jun. 20, 2013

(30) Foreign Application Priority Data

Dec. 20, 2011 (JP) .................................. 2011-278848

(51) Int. Cl.
*F21V 7/04* (2006.01)
*F21V 8/00* (2006.01)
*G02F 1/1335* (2006.01)

(52) U.S. Cl.
CPC .......... *G02B 6/0011* (2013.01); *G02F 1/133615* (2013.01); *G02B 6/0088* (2013.01)
USPC ............................ 362/633; 362/632; 362/634

(58) Field of Classification Search
CPC .................... G02F 1/133608; G02F 1/133615; G02B 6/0088; G02B 6/0093
USPC .................................................. 362/632–634
See application file for complete search history.

(56) References Cited

U.S. PATENT DOCUMENTS

2005/0259443 A1* 11/2005 Lin .............................. 362/632
2007/0279944 A1* 12/2007 Sakai ........................... 362/633
2010/0073582 A1 3/2010 Konno et al.

FOREIGN PATENT DOCUMENTS

| JP | 2003-168311 | 6/2003 |
| JP | 2009-158233 | 7/2009 |
| JP | 2011-171162 | 9/2011 |

OTHER PUBLICATIONS

Office Action in Japanese Patent Application No. 2011-278848, mailed Apr. 22, 2014, with an English language translation of the Office Action.

* cited by examiner

*Primary Examiner* — Sean Gramling
(74) *Attorney, Agent, or Firm* — Antonelli, Terry, Stout & Kraus, LLP.

(57) ABSTRACT

A display device is provided with a backlight system and a display panel which controls and selectively transmits light from the backlight system, and the device is formed such that the backlight system contains the light source, the light guide plate OG and the optical sheet OS within a lower frame SF and has such a structure that the lower frame is covered by a middle frame NF that covers around an opening on an upper surface of the lower frame, at least one portion around the light guide plate is provided with an elastic member EP placed between the lower frame and the light guide plate, and the elastic member is provided with a protrusion that covers part of an upper surface of the light guide plate, and the middle frame presses (B) the elastic member against the lower frame so that the protrusion holds (C) the light guide plate within the lower frame.

6 Claims, 7 Drawing Sheets

DISPLAY DEVICE

CROSS-REFERENCE TO RELATED APPLICATION

The present application claims priority over Japanese Patent Application JP2011-278848 filed on Dec. 20, 2011, the contents of which are hereby incorporated into this application by reference.

BACKGROUND OF THE INVENTION (1) Field of the Invention

The present invention relates to a display device, and in particular, to a display device having a backlight system, such as a liquid crystal display device.

(2) Description of the Related Art

In display devices, such as liquid crystal display devices, the display panel is not a self-luminous display panel, unlike plasma display panels or organic electroluminescent panels, and therefore, the rear surface of the display panel is provided with a backlight system that functions as a surface light source.

In backlight systems for mid and small-sized liquid crystal display devices, a light guide plate or an optical sheet made of polycarbonate is sandwiched between the middle and lower frames in the backlight. In the design of this part with clearance, the member has a great coefficient of thermal expansion in the X direction (left and right directions of the display screen) and in the Y direction (upward and downward directions of the display screen), and therefore, a structure for suppressing unsteadiness is used. In contrast to this, the amount of expansion of the member is small in the Z direction (front and rear directions of the display screen), and therefore, no structure for suppressing unsteadiness has any great effects, and thus, none have been taken into consideration according to the prior art.

The clearance in the Z direction between the inner surface of the middle frame and the upper surface of the optical sheet is approximately 0.2 mm to 0.3 mm when the lower frame, a reflective plate, a light guide plate and an optical sheet are layered on top of each other in this order. When a certain vibration is applied to a conventional display device, the members within the backlight move in the Z direction, causing friction between the optical sheet and the edge around the opening of the middle frame, and thus, the optical sheet is scratched. In addition, the vibration causes such a problem that noise is created by the unsteadiness.

JP 2003-168311A discloses a technology for arranging and securing a light guide plate made of an acryl-based resin or the like within a frame made of a polyprene resin or the like. Concretely, it is disclosed that a recess is created inside the frame and a protrusion is formed in a predetermined location around the light guide plate, and thus, a rubber cap is placed in the gap between the recess and the protrusion in such a state that the two are engaged with each other.

In accordance with the securing method in JP 2003-168311A, however, the effects of suppressing unsteadiness in the Z direction, which is the front and rear directions of the display screen, is insufficient, though the unsteadiness of the display screen can be suppressed in the X direction and the Y direction.

Though a structure is also possible where the middle frame directly holds the main surface of the light guide plate, this still causes problems. For example, the following problems arise.

(1) A process for indenting the middle frame so that it reaches the level of the light guide plate is necessary.

(2) In place of the structure of the above (1), the light guide plate is provided with a protrusion that reaches inside the middle frame (a process for this is difficult).

(3) The structures of the above (1) and (2) cause scratches or allows foreign substances on the light guide plate due to the friction at the time of vibration.

(4) The crossing of parts makes the gap slightly larger, which causes unsteadiness.

SUMMARY OF THE INVENTION

An object of the present invention is to solve the above-described problems and to provide a display device where the light guide plate can be prevented from creating noise due to unsteadiness and scratches on the optical sheet and the creation of foreign substances due to the vibration of the light guide plate can be prevented.

In order to achieve the above-described object, the display device according to the present invention has the following features.

(1) A display device having; a backlight system where a light source, a light guide plate and an optical sheet are arranged to form a surface light source; and a display panel which controls and selectively transmits light from the backlight system, is characterized in that the backlight system contains the light source, the light guide plate and the optical sheet within a lower frame and has such a structure that the lower frame is covered by a middle frame that covers around an opening on an upper surface of the lower frame, at least one portion around the light guide plate is provided with an elastic member placed between the lower frame and the light guide plate, and the elastic member is provided with a protrusion that covers part of an upper surface of the light guide plate, and the middle frame presses the elastic member against the lower frame so that the protrusion holds the light guide plate within the lower frame.

(2) The display device according to the above (1) is characterized in that the elastic member is provided with a portion to be engaged with the lower frame so as to be placed in a predetermined location of the lower frame.

(3) The display device according to the above (1) or (2) is characterized in that an uneven portion to be engaged with the elastic member is formed around the light guide plate in order to restrict the movement of the light guide plate within a plane on the emission side.

(4) The display device according to the above (3) is characterized in that one or more elastic members that are the same as the elastic member are further provided, and at least one elastic member has such a structure as to engage with the uneven portion of the above-described light guide plate.

According to the present invention, the elastic member provided around the light guide plate has a protrusion that covers the light guide plate, and when the middle frame presses the elastic member against the lower frame, the protrusion holds the light guide plate within the lower frame, and therefore, it is possible to suppress the unsteadiness of the light guide plate, and thus, no noise is created from the unsteadiness. In addition, the light guide plate can be pressed down so that the optical sheet can be prevented from being lifted strongly due to the springing up of the light guide plate, and thus, it is also possible to prevent friction between the edge around the opening of the middle frame and the optical sheet and foreign substances from being created due to such friction.

BRIEF DESCRIPTION OF THE DRAWINGS

FIGS. 5A and 5B are diagrams illustrating the function of the elastic member EP, where FIG. 5A shows the elastic member in the present invention and FIG. 5B shows a conventional elastic member;

FIGS. 6A and 6B are perspective diagrams showing the elastic member, where FIG. 6A shows an example where there are no means for restricting the movement of the light guide plate in a plane on the emission side, and FIG. 6B shows an example where there is such a restricting means;

FIGS. 7A and 7B are diagrams for illustrating an example where elastic members are placed on the corners of the light guide plate, where FIG. 7A is a perspective diagram showing the entirety as viewed from the front side, and FIG. 7B is a perspective diagram showing an elastic member as viewed from the rear side; and FIGS. 8A and 8B are diagrams for illustrating an example of an application of a portion where an elastic member and the lower frame engage with each other, where FIG. 8A is a cross-sectional diagram and FIG. 8B is a perspective diagram showing an elastic member as viewed from the rear side.

DESCRIPTION OF THE EMBODIMENTS

The display device according to the present invention is described in detail below.

Figure 1:
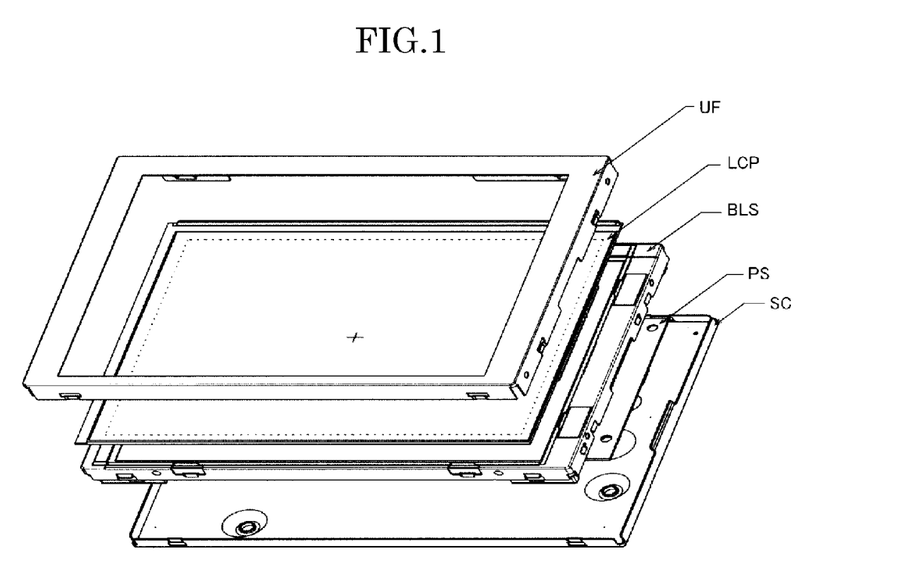
FIG. 1 is an exploded diagram showing an example of the display device according to the present invention.

As shown in FIG. 1, the display device according to the present invention has such a structure that a display panel, such as a liquid crystal display panel LCP, where light is controlled and selectively transmitted and a backlight system BLS (which may also be referred to as a backlight unit, or simply, backlight) are layered on top of each other. FIG. 1 is an exploded diagram showing the liquid crystal display device according to one embodiment of the present invention, where the backlight BLS is provided on the rear side of the liquid crystal display panel LCP, and furthermore, a power supply substrate PS for driving the liquid crystal display panel LCP and the backlight BLS as well as a substrate cover SC are provided on the rear side thereof. In addition, an upper frame UF is provided on the front side of the liquid crystal display panel LCP in such a manner that the upper frame UF and the substrate cover SC are integrated so as to form the outer frame of the liquid crystal display device.

Figure 2:
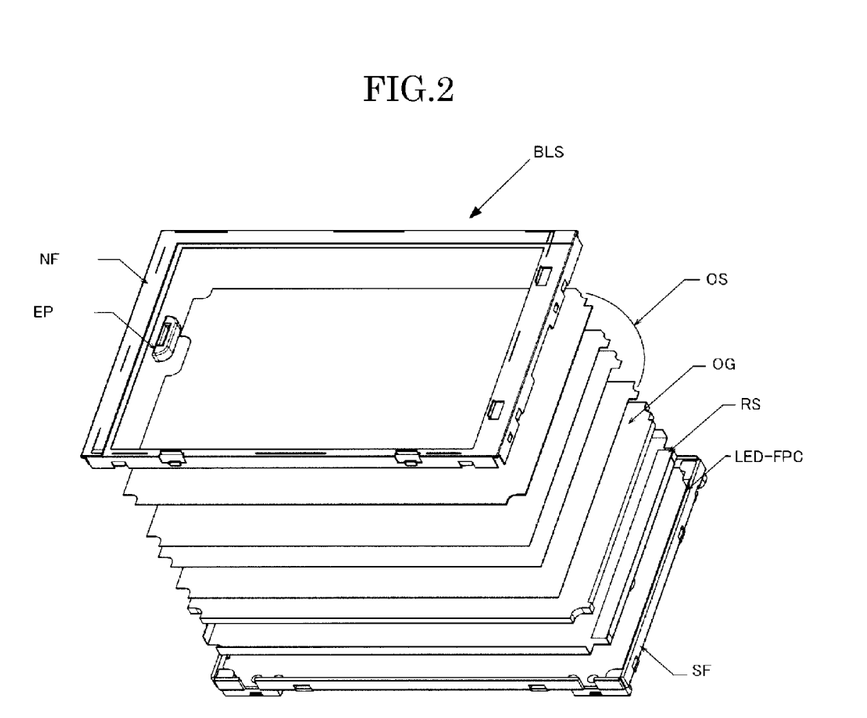
FIG. 2 is an exploded diagram showing the backlight system used in the display device according to the present invention.

FIG. 2 is an exploded diagram showing the backlight BLS. Light emitting diodes (LEDs), which are a light source, are provided in predetermined locations inside the lower frame SF (for example, along a side inside the lower frame) in such a state as being mounted on a flexible printed circuit (FPC).

A reflective sheet RS, a light guide plate OG and an optical sheet OS formed of a diffusion sheet or a prism sheet are provided within the lower frame SF and layered on top of each other. In addition, a middle frame NF covers the lower frame SF so as to cover around the opening in the upper surface of the lower frame SF. In particular, the light guide plate is formed of polycarbonate or the like so as to allow light from the light emitting diodes LEDs provided in the vicinity of a side of the light guide plate to be diffused uniformly, and thus functions to form a surface light source.

Figure 3:
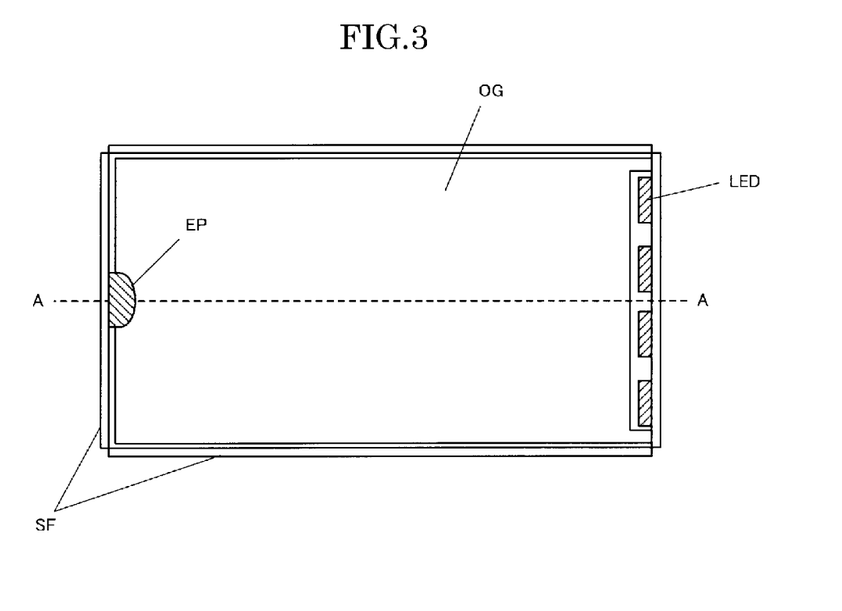
FIG. 3 is a plan diagram showing the light source, the light guide plate and the elastic member EP contained within the lower frame.

The display device according to the present invention is characterized by having an elastic member EP for arranging and securing the light guide plate in a predetermined location within the lower frame. FIG. 3 is a plan diagram schematically showing the backlight BLS in such a state where the middle frame and the optical sheet are omitted for the convenience of explanation. The light emitting diodes LEDs that are a light source are provided in the vicinity of a side of the light guide plate OG, and the elastic member EP is placed between the lower frame SF and the light guide plate OG in at least one portion around the light guide plate OG.

Figure 4:
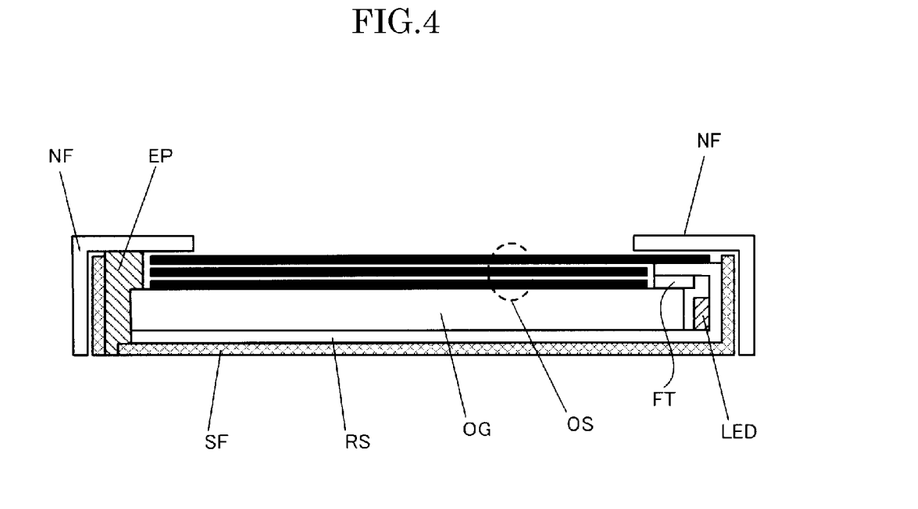
FIG. 4 is a cross-sectional diagram showing the backlight system along dotted line A in FIG. 3.

FIG. 4 is a cross-sectional diagram showing the backlight system BLS along dotted line A in FIG. 3. The reflective sheet RS is provided on the rear surface of the light guide plate OG that is provided inside the lower frame SF. Part of the reflective sheet is bent in a C shape and arranged to cover part of the surface of the light guide plate and may be formed so as to be secured to the light guide plate OG by means of a fixture tape FT with double-sided adhesion.

Figure 5A:
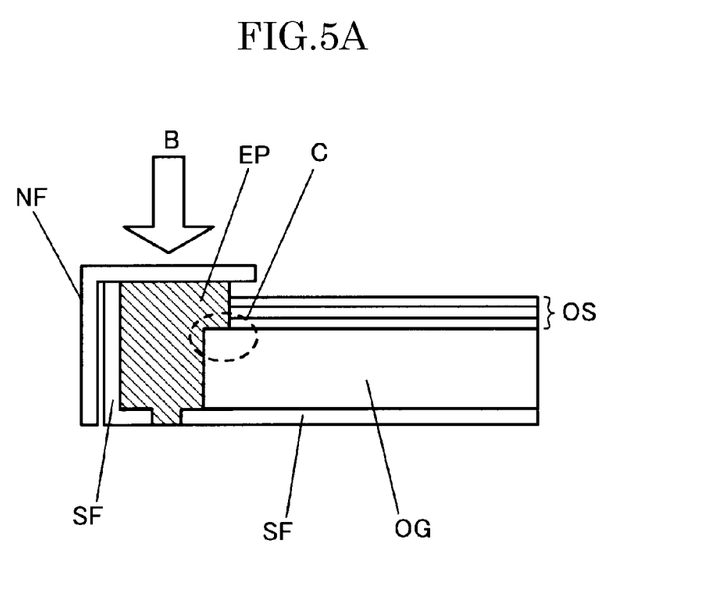

As shown in FIG. 4 and FIG. 5A, which shows the enlargement of a portion including and in the vicinity of the elastic member, the elastic member EP used in the present invention has a protrusion that covers part of the upper surface of the light guide plate OG. When the middle frame NF presses the elastic member EP against the lower frame SF (arrow B), the structure allows the protrusion to hold the light guide plate OG within the lower frame, as shown by the dotted line C.

The optical sheet OS is provided on the front side of the light guide plate OG and is held in such a manner as to be sandwiched between the light guide plate OG and the middle frame NF. The elastic member EP holds the light guide plate OG so as to prevent the light guide plate from being unstable or shifted in the Z direction (front and rear directions of the display screen, upward and downward directions in FIGS. 4, 5A and 5B). As a result, it is also possible to prevent the edge around the opening of the middle frame NF and the optical sheet from causing friction between each other due to the movement of the light guide plate OG or foreign substances from being created due to such a friction.

Figure 5B:
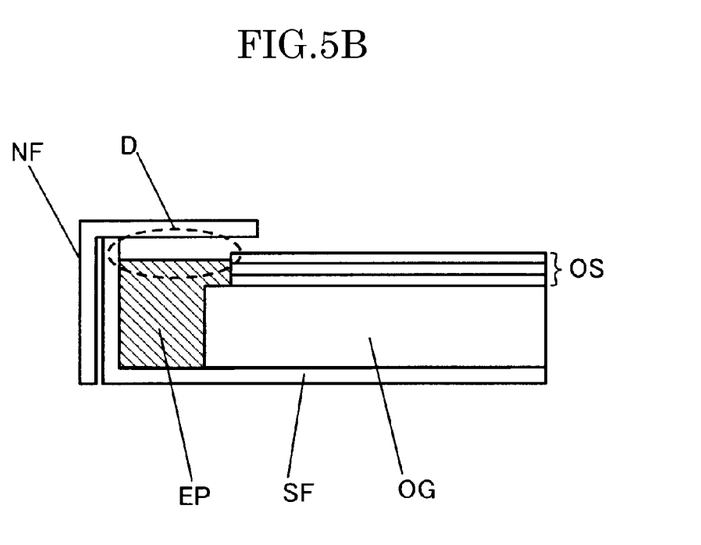

In contrast to this, as shown in FIG. 5B, in conventional display devices, such as in JP 2003-168311A, the elastic member EP is inserted and secured between the side of the resin mold (the side of the lower frame SF in the same manner as in the present invention in order to make the comparison with the present invention easier in FIG. 5B) and the light guide plate OG due to the friction generated between the side and the elastic member as well as between the elastic member and the light guide plate. As a result, there is clearance between the elastic member EP and the inner surface of the middle frame NF in a portion shown by the dotted line D, and thus, the structure is vulnerable to vibrations in the Z direction and allows the light guide plate OG to move easily.

Figure 6A:
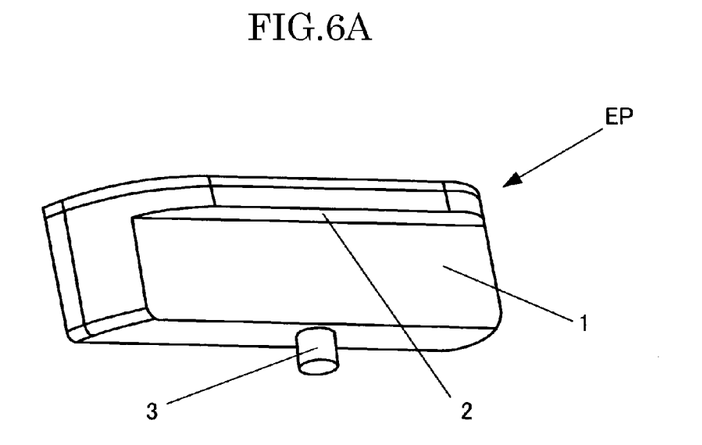
Figure 6B:
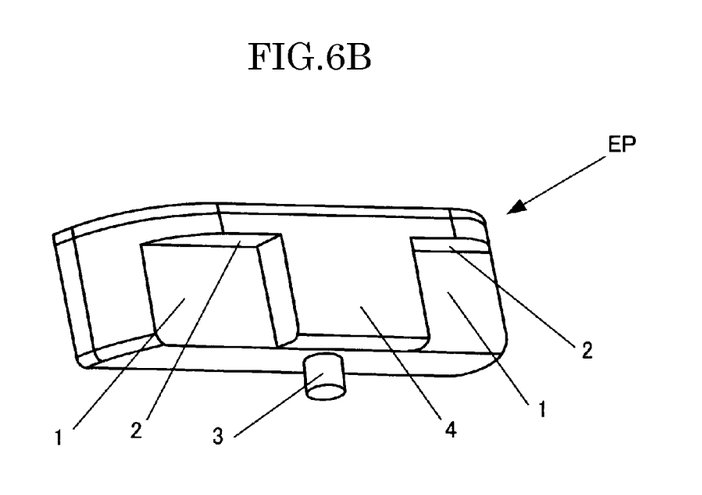

It is possible for the elastic member in the present invention to adopt the form shown in FIGS. 6A and 6B. For the elastic member EP, a rubber bush made of a polyethyl-based resin is preferably available. In FIG. 6A, the elastic member EP is formed to have a cut surface 1 with which a side of the light guide plate is to make contact. In addition, the protrusion 2 is to cover part of the upper surface of the light guide plate, and thus functions to press the light guide plate against the lower frame.

In addition, the protrusion 3 on the elastic member EP is to be inserted into an opening or a recess created in the lower frame in a predetermined location, and thus forms a portion that is to be engaged with the lower frame. The form of the engaging portion is not limited to those shown in FIGS. 6A and 6B, but may be a portion denoted by the number 30 in FIG. 7B or the number 32 in FIG. 8B. In the case of FIGS. 8A and 8B in particular, it is possible to form a protrusion 31 by making a portion of the lower frame SF stand up and to create a recess 32 in the elastic member EP, for example, so that an engaging portion where the two engage with each other can be formed.

The above-described engaging portion can restrict the movement of the elastic member EP within the lower frame and can restrict the movement of the light guide plate in at least one direction (in the direction of the normal to the cut surface 1 or 10). Naturally, the protrusion 2 on the elastic member restricts the movement of the light guide plate in the Z direction.

In order to restrict the movement of the light guide plate OG in a plane on the emission side (in the X and Y directions), as shown in FIG. 6B, a protrusion 4 is formed. This protrusion 4 is formed so as to engage with a recess (not shown) created around the light guide plate. Naturally, it may be a recess instead of a protrusion that is formed on the elastic member EP. In such a case, a protrusion that is to engage with the recess is formed on the elastic member. In this manner, the elastic member and the light guide plate form an engaging portion, which restricts the movement in the directions (left and right directions in the figure) along the cut surface 1.

It is also possible for one or more elastic members that are the same as that shown in FIG. 6A or 6B to be provided around the light guide plate. In the case where a number of elastic members are provided, at least one elastic member can have such a structure as to engage with an uneven portion on the light guide plate, and thus, it is possible to restrict the movement in the direction parallel to one side of the light guide plate, even in the case where no elastic member is provided to this side.

Figure 7A:
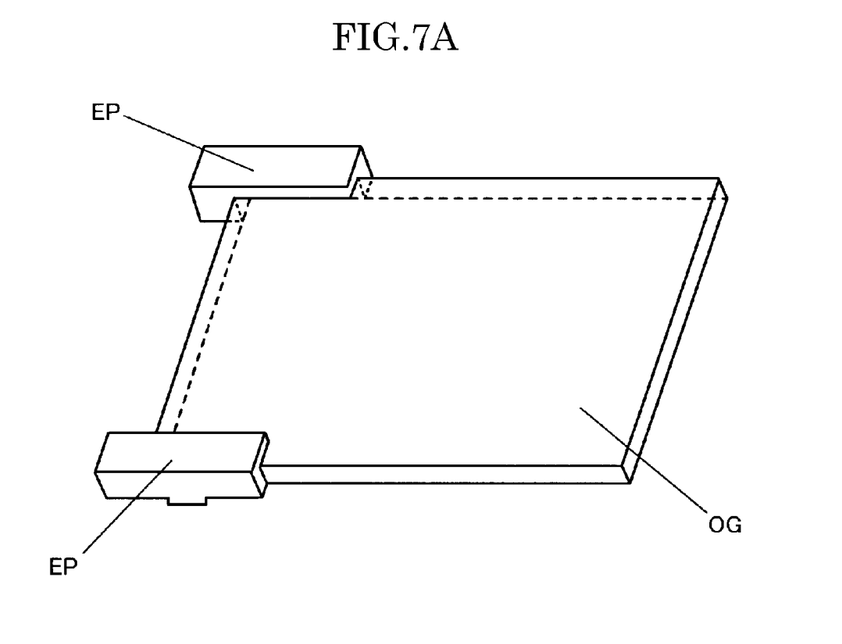
Figure 7B:
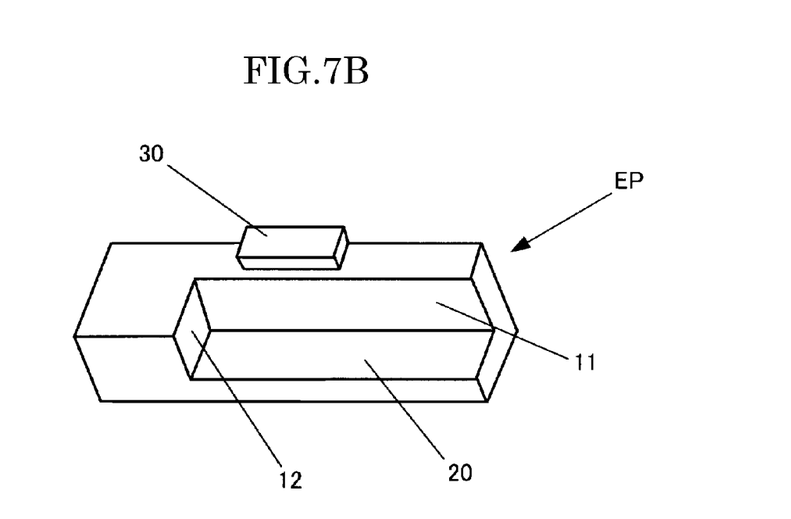
Figure 8A:
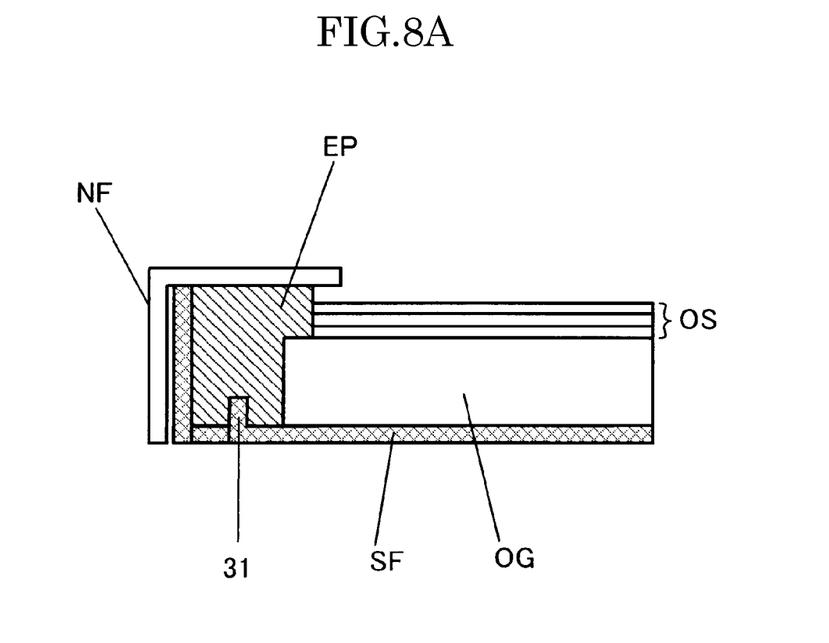
Figure 8B:
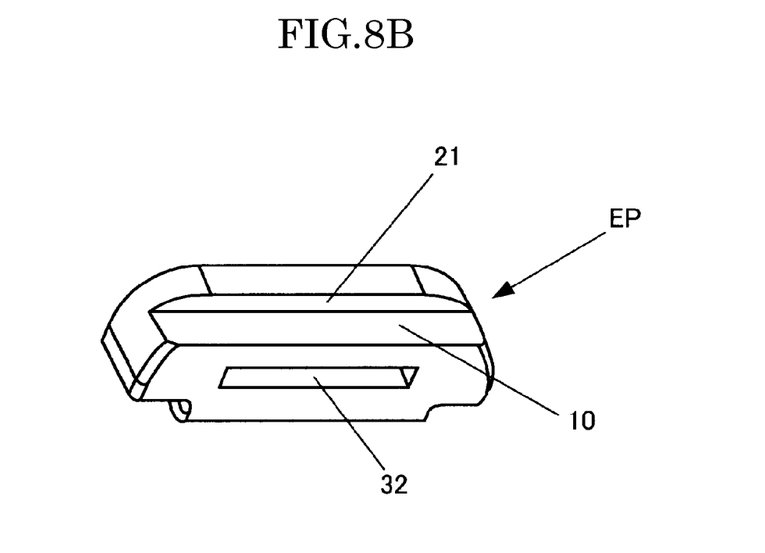

Furthermore, as shown in FIGS. 7A and 7B, it is also possible to provide elastic members EP on corners of the light guide plate OG. FIG. 7B is a perspective diagram showing an elastic member EP to be arranged as in FIG. 7A as viewed from the rear side. The cut surfaces 11 and 12 of the elastic member make it possible for the movement of the light guide plate to be restricted in the direction towards the cut surfaces along the normals to the surfaces. In addition, the movement of the light guide plate in the Z direction can be restricted by the protrusion 20. When elastic members are provided on the corners, it is also possible to form the display device with a narrower frame.

When the above-described elastic members EP are used in such a manner that the elastic members (rubber bushes) for securing the light guide plate are pressed down by themselves, it is possible to suppress the unsteadiness of the light guide plate, and thus, noise can be prevented from being created due to the unsteadiness. In addition, the light guide plate can be pressed down so that the optical sheet can be prevented from being lifted up strongly due to the springing up of the light guide plate, and thus, it is possible to prevent foreign substances from being created due to the friction between the edge around the opening of the middle frame and the sheet.

Furthermore, the method for fixing the light guide plate using the form of the elastic members allows the assembly to have a simple structure and makes it easier for the assembly to be repaired. Moreover, the forms of the elastic members (rubber bushes) and the light guide plate make the fixture possible, which makes an expensive mold unnecessary, and thus, inexpensive fabrication is possible.

The present invention can be preferably applied to any display device where a light guide plate is used in the backlight system, and for example, can be applied to mid and small-sized liquid crystal display devices to be mounted in a car or for amusement.

As described above, the present invention makes it possible to provide a display device where noise can be prevented from being created due to the unsteadiness of the light guide plate, and scratches on the optical sheet and foreign substances can be prevented from being created due to the vibration of the light guide plate.

What is claimed is:

1. A display device, comprising: a backlight system where a light source, a light guide plate and an optical sheet are arranged to form a surface light source; and a display panel which controls and selectively transmits light from the backlight system, characterized in that the backlight system contains the light source, the light guide plate and the optical sheet within a lower frame and has such a structure that the lower frame is covered by a middle frame that covers around an opening on an upper surface of the lower frame, at least one portion around the light guide plate is provided with an elastic member placed between the lower frame and the light guide plate so that the elastic member contacts a side surface of the light guide plate, the elastic member is provided with a protrusion that covers part of an upper surface of the light guide plate, and the middle frame presses the elastic member against the lower frame so that the protrusion of the elastic member holds the light guide plate within the lower frame, and the protrusion of the elastic member interposes between the middle frame and the upper surface of the light guide plate, and an other part of the elastic member interposes between the side surface of the light guide plate and the lower frame.

2. The display device according to claim 1, characterized in that the elastic member is provided with a portion to be engaged with the lower frame so as to be placed in a predetermined location of the lower frame.

3. The display device according to claim 1, characterized in that an uneven portion of the light guide plate to be engaged with the elastic member is formed at least at the side surface of the light guide plate in order to restrict the movement of the light guide plate within a plane on the emission side.

4. The display device according to claim 2, characterized in that an uneven portion of the light guide plate to be engaged with the elastic member is formed at least at the side surface of the light guide plate in order to restrict the movement of the light guide plate within a plane on the emission side.

5. The display device according to claim 3, characterized in that one or more other elastic members that are the same as the elastic member are further provided, and at least one of the elastic member and the other elastic members has such a structure as to engage with the uneven portion of the light guide plate.

6. The display device according to claim 4, characterized in that one or more other elastic members that are the same as the elastic member are further provided, and at least one of the elastic member and the other elastic members has such a structure as to engage with the uneven portion of the light guide plate.

* * * * *